United States Patent
Mullins et al.

(10) Patent No.: US 8,745,973 B2
(45) Date of Patent: Jun. 10, 2014

(54) SYSTEM AND METHOD FOR CONTROLLING REDUCING AGENT INJECTION IN A SELECTIVE CATALYTIC REDUCTION SYSTEM

(75) Inventors: Jason Daniel Mullins, Howell, MI (US);
Rebecca J Darr, Milford, MI (US);
Kyle E. Crawford, Howell, MI (US);
Paul Jasinkiewicz, Northville, MI (US)

(73) Assignee: GM Global Technology Operations LLC

( * ) Notice: Subject to any disclaimer, the term of this patent is extended or adjusted under 35 U.S.C. 154(b) by 683 days.

(21) Appl. No.: 12/544,672

(22) Filed: Aug. 20, 2009

(65) Prior Publication Data

US 2011/0041477 A1      Feb. 24, 2011

(51) Int. Cl.
*F01N 3/00*      (2006.01)
*F01N 1/00*      (2006.01)

(52) U.S. Cl.
USPC ............... 60/301; 60/295; 60/299; 60/272; 60/286

(58) Field of Classification Search
CPC   F01N 2550/20; F01N 2550/05; F01N 3/0885
USPC .................................................. 60/272–324
See application file for complete search history.

(56) References Cited

U.S. PATENT DOCUMENTS

| | | | | |
|---|---|---|---|---|
| 6,119,448 A * | 9/2000 | Emmerling et al. | ............ | 60/274 |
| 6,209,313 B1 * | 4/2001 | Wissler et al. | ................. | 60/274 |
| 6,427,439 B1 * | 8/2002 | Xu et al. | ........................ | 60/286 |
| 6,546,720 B2 * | 4/2003 | van Nieuwstadt | .............. | 60/286 |
| 7,114,326 B2 * | 10/2006 | Mukaihira et al. | .............. | 60/277 |
| 7,765,798 B2 * | 8/2010 | Bruck | .............................. | 60/286 |
| 7,856,808 B2 * | 12/2010 | Sisken | ............................ | 60/295 |
| 2003/0226545 A1 * | 12/2003 | Dingle | .......................... | 123/435 |
| 2004/0098973 A1 * | 5/2004 | Tennison et al. | ................ | 60/286 |
| 2004/0098980 A1 * | 5/2004 | Montreuil et al. | .............. | 60/295 |
| 2006/0130458 A1 * | 6/2006 | Solbrig | ............................ | 60/286 |
| 2008/0022659 A1 * | 1/2008 | Viola et al. | ....................... | 60/286 |
| 2009/0107118 A1 * | 4/2009 | Ruona | ............................ | 60/286 |
| 2009/0120068 A1 * | 5/2009 | Sakimoto et al. | ............... | 60/285 |
| 2009/0165442 A1 * | 7/2009 | Hara | ................................ | 60/286 |
| 2009/0217645 A1 * | 9/2009 | Sisken et al. | ..................... | 60/286 |
| 2009/0272102 A1 * | 11/2009 | Ofoli et al. | ....................... | 60/286 |
| 2010/0050614 A1 * | 3/2010 | Parmentier et al. | ............. | 60/287 |

FOREIGN PATENT DOCUMENTS

CN         101300410        11/2008
CN       101424204(A)        5/2009

* cited by examiner

*Primary Examiner* — Thomas Denion
*Assistant Examiner* — Anthony Ayala Delgado

(57) ABSTRACT

An engine control system includes a dosing control module and an offset determination module. The dosing control module actuates an injector to inject a first amount of reducing agent into exhaust gas produced by an engine during a period when a temperature of the exhaust gas is greater than a predetermined temperature threshold. The offset determination module determines an efficiency of a selective catalytic reduction (SCR) material based on measured amounts of nitrogen oxide (NOx) during the period and expected NOx amounts, wherein the measured amounts of NOx are measured at locations upstream and downstream from the SCR material, and wherein the expected NOx amounts are based on the temperature of the exhaust gas and the first amount of reducing agent.

19 Claims, 3 Drawing Sheets

SYSTEM AND METHOD FOR CONTROLLING REDUCING AGENT INJECTION IN A SELECTIVE CATALYTIC REDUCTION SYSTEM

FIELD

The present disclosure relates to internal combustion engines, and more particularly to a system and method for controlling injection of a reducing agent in a selective catalytic reduction (SCR) system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air/fuel (A/F) mixture within cylinders to drive pistons and generate drive torque. The combustion of the A/F mixture produces exhaust gas which may be expelled from the cylinders through exhaust valves and an exhaust manifold. The exhaust gas may include carbon monoxide (CO), hydrocarbons (HC), and nitrogen oxides (NOx). Exhaust treatment systems may be implemented to reduce CO, HC, and/or NOx in the exhaust gas. For example, an exhaust treatment system may include, but is not limited to, an oxidation catalyst (OC), a particulate matter filter (PMF), and a selective catalytic reduction (SCR) system. The OC oxidizes CO and HC to form carbon dioxide ($CO_2$) and water ($H_2O$). The PMF removes particulate matter from the exhaust gas. The SCR system reduces NOx in the exhaust gas.

The SCR system may use a reductant to reduce NOx emissions. For example, the reductant may be ammonia ($NH_3$). In an SCR process, NOx reacts with the reductant to be absorbed onto an SCR catalyst. The SCR catalyst may also be referred to as an SCR material. The reductant may be introduced into the exhaust stream by injecting a reducing agent using a dosing system. For example only, the reducing agent may be pure anhydrous ammonia, aqueous ammonia, or urea. The injected reducing agent breaks down in the exhaust gas to form the reductant that is utilized to react with the NOx. The following exemplary chemical relationships may describe the NOx reduction:

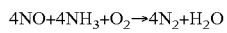

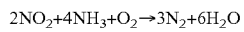

The SCR process reduces NOx in the exhaust gas, forming water vapor ($H_2O$) and nitrogen gas ($N_2$).

The ability of the SCR catalyst to absorb ammonia may be a function of temperature. More specifically, a storage capacity of the SCR catalyst may decrease when a temperature of the SCR catalyst increases. Thus, excess amounts of ammonia may be stored in the SCR catalyst at low operating temperatures, which may result in a high NOx conversion efficiency. As SCR catalyst temperature increases, however, stored ammonia may be released from the SCR catalyst due to decreasing storage capacity. The released ammonia may affect NOx conversion efficiency because NOx sensors may detect the released ammonia as NOx. Furthermore, the released ammonia may be oxidized into NOx by a high temperature catalyzed PMF downstream, thus increasing NOx emissions.

SUMMARY

An engine control system includes a dosing control module and an offset determination module. The dosing control module actuates an injector to inject a first amount of reducing agent into exhaust gas produced by an engine during a period when a temperature of the exhaust gas is greater than a predetermined temperature threshold. The offset determination module determines an efficiency of a selective catalytic reduction (SCR) material based on measured amounts of nitrogen oxide (NOx) during the period and expected NOx amounts, wherein the measured amounts of NOx are measured at locations upstream and downstream from the SCR material, and wherein the expected NOx amounts are based on the temperature of the exhaust gas and the first amount of reducing agent.

A method includes actuating an injector to inject a first amount of reducing agent into exhaust gas produced by an engine during a period when a temperature of the exhaust gas is greater than a predetermined temperature threshold, and determining an efficiency of a selective catalytic reduction (SCR) material based on measured amounts of nitrogen oxide (NOx) during the period and expected NOx amounts, wherein the measured amounts of NOx are measured at locations upstream and downstream from the SCR material, and wherein the expected NOx amounts are based on the temperature of the exhaust gas and the first amount of reducing agent.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
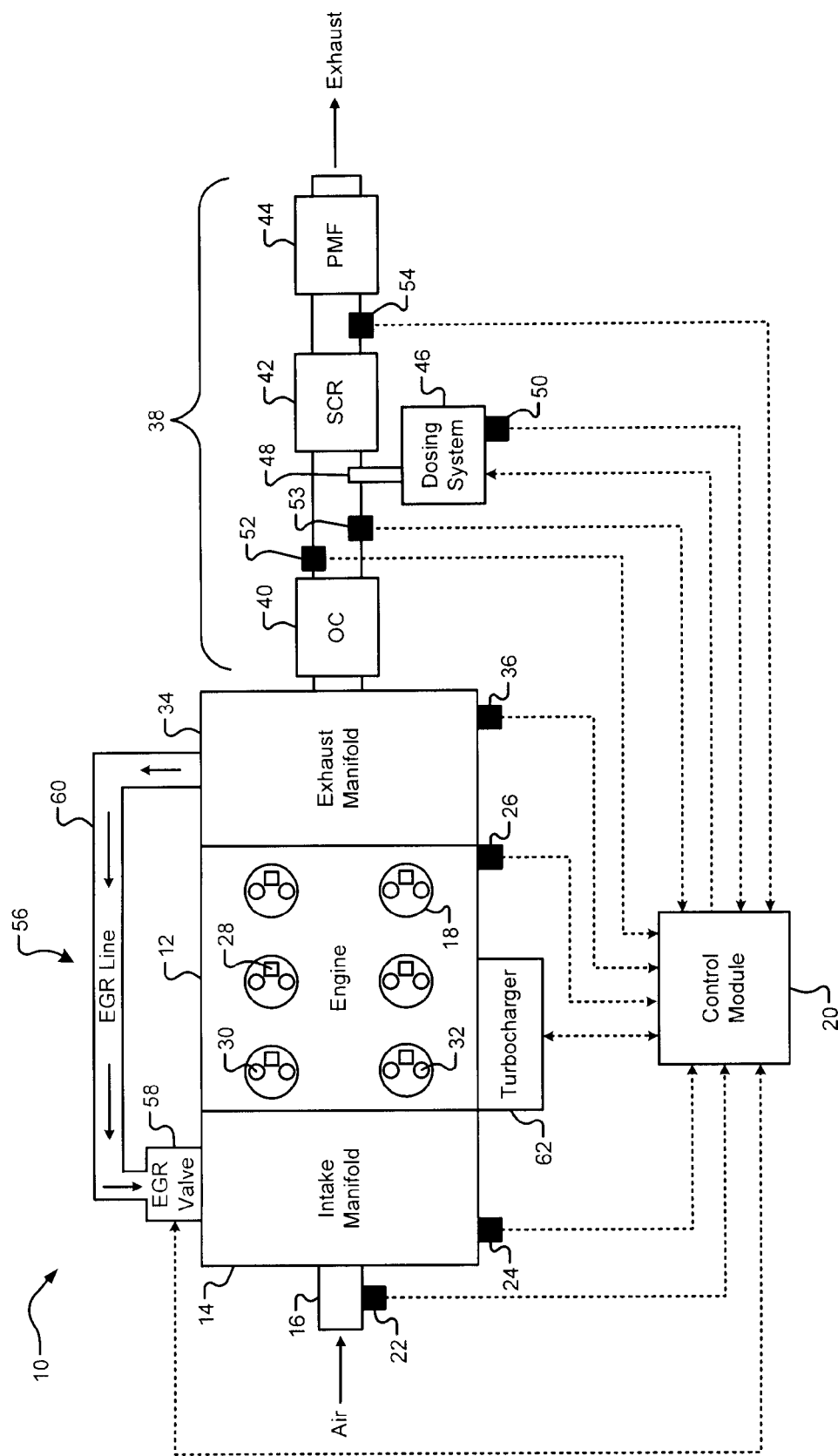
FIG. 1 is a functional block diagram of an exemplary engine system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory including one or more software or firmware programs, and/or a combinational logic circuit that provides the described functionality.

In selective catalytic reduction (SCR) systems, an amount of reducing agent injected into the exhaust gas may require precise control to prevent unreacted ammonia ($NH_3$) in the exhaust gas. The amount of reducing agent injected into the exhaust gas may be varied by a dosing offset. In other words, the dosing offset may represent a difference from a predetermined amount of reducing agent (corresponding to normal operation). Varying injection of the reducing agent by the dosing offset may increase SCR efficiency.

Conventional engine control systems determine dosing offsets in SCR systems by adjusting an ammonia load on the SCR catalyst (i.e. adjusting the dosing quantity) and observing feedback from a downstream NOx sensor. These systems, however, may take a long time to determine the dosing offset (e.g., minutes). For example, the delay may be due to relatively low temperatures of the SCR catalyst during normal operation of the exhaust treatment system. The SCR system may operate inefficiently during the delay due to an unknown or inaccurate dosing offset, thereby increasing emissions.

Therefore, a system and method is presented that provides for faster determination of dosing offset in an SCR system. More specifically, the system and method may determine the dosing offset during periods when exhaust temperature is greater than a predetermined threshold. For example, a regeneration cycle of a PMF may be an optimal time to determine the dosing offset in the SCR system due to a low (i.e. near zero) ammonia load on the SCR catalyst. Furthermore, the high temperatures during the regeneration cycle of the PMF decrease chemical reaction times, and thus the offset may be determined in a short amount of time (e.g., seconds). Alternatively, the system and method may also increase the exhaust gas temperature above the predetermined threshold and then determine the dosing offset. For example, engine air/fuel (A/F) ratio, hydrocarbon (HC) injection into the exhaust stream, and/or exhaust gas recirculation (EGR) may be controlled to increase the exhaust gas temperature. The faster determination of the dosing offset may increase efficiency of the SCR system and thus may decrease emissions.

Referring now to FIG. 1, an engine system 10 includes an engine 12 that combusts an A/F mixture to produce drive torque. Air is drawn into an intake manifold 14 through an inlet 16. A throttle (not shown) may be included to regulate air flow into the intake manifold 14. Air within the intake manifold 14 is distributed into cylinders 18. Although FIG. 1 depicts six cylinders 18, the engine 12 may include additional or fewer cylinders 18.

The engine system 10 includes a control module 20 that communicates with components of the engine system 10. The components may include the engine 12, sensors, and actuators as discussed herein. The control module 20 may implement the system and/or method of the present disclosure to control injection of a reducing agent in an exhaust treatment system 38.

Air is passed from the inlet 16 through a mass airflow (MAF) sensor 22. The MAF sensor 22 generates a MAF signal that indicates a rate of air flowing through the MAF sensor 22. An intake manifold absolute pressure (MAP) sensor 24 is positioned in the intake manifold 14 between the inlet 16 and the engine 12. The MAP sensor 24 generates a MAP signal that indicates air pressure in the intake manifold 14.

An engine crankshaft (not shown) rotates at engine speed or a rate that is proportional to engine speed. A crankshaft sensor 26 senses a position of the crankshaft and generates a crankshaft position (CSP) signal. The CSP signal may be related to the rotational speed of the crankshaft and cylinder events. For example only, the crankshaft sensor 26 may be a variable reluctance sensor. The engine speed and cylinder events may also be sensed using other suitable methods.

The control module 20 actuates fuel injectors 28 to inject fuel into the cylinders 18. While a direct-injection engine 12 is shown, it can be appreciated that other fuel injection methods may be implemented, such as port-injection. An intake valve 30 selectively opens and closes to enable air to enter the cylinder 18. An intake camshaft (not shown) regulates intake valve position. A piston (not shown) compresses and combusts the A/F mixture within the cylinder 18. The piston drives the crankshaft during a power stroke to produce drive torque. Exhaust gas resulting from the combustion within the cylinder 18 is forced out through an exhaust manifold 34 when an exhaust valve 32 is in an open position. An exhaust camshaft (not shown) regulates exhaust valve position. While intake and exhaust camshafts are described, it can be appreciated that a single camshaft may be implemented to control both the intake valves 30 and the exhaust valves 32. An exhaust manifold back pressure (EBP) sensor 36 generates an EBP signal that indicates exhaust manifold pressure.

The exhaust treatment system 38 may treat the exhaust gas. The exhaust treatment system 38 may include an oxidation catalyst (OC) 40, an SCR catalyst 42, and a particulate matter filter (PMF) 44. The OC 40 oxidizes carbon monoxide (CO) and hydrocarbons (HC) in the exhaust gas. The SCR catalyst 42 uses a reducing agent to reduce NOx in the exhaust gas. The PMF 44 removes particulate matter from the exhaust gas.

The engine system 10 includes a dosing system 46. The dosing system 46 stores the reducing agent. For example, the reducing agent may include a urea/water solution. The dosing system 46 may control a temperature of the reducing agent. For example, the dosing system 46 may heat the reducing agent to prevent freezing of the reducing agent. The control module 20 may actuate the dosing system 46 to control the temperature of the reducing agent and/or determine a current temperature of the reducing agent. The dosing system 46 may determine an amount of the reducing agent remaining in the dosing system 46. The dosing system 46 may pressurize the reducing agent for delivery to a reducing agent injector 48. For example, a sensor 50 may measure temperature, amount, and/or pressure of the reducing agent in the dosing system 46. The control module 20 may actuate the dosing system 46 to control a pressure of the reducing agent for delivery to the reducing agent injector 48.

The reducing agent injector 48 measures and controls an amount of the reducing agent injected into the exhaust gas that flows through the exhaust treatment system 38. The reducing agent is mixed with the exhaust gas to carry out the reduction of NOx in the SCR catalyst 42. The control module 20 may actuate the reducing agent injector 48 to measure and control the amount of the reducing agent injected into the exhaust gas. The control module 20 may apply a voltage and/or current to the reducing agent injector 48 to actuate the reducing agent injector 48 (i.e. via the dosing system 46). The voltage and/or current applied to the reducing agent injector 48 controls the amount of reducing agent injected into the exhaust gas.

The control module 20 may implement the system and method of the present disclosure. For example, in one embodiment the control module 20 may initiate a regeneration cycle of the PMF 44 or determine when a regeneration cycle of the PMF 44 is occurring or is imminent. The control module 20 may then determine a dosing offset of the SCR catalyst 42 during the regeneration cycle of the PMF 44. In other words, the control module 20 may determine an efficiency of the SCR catalyst 42, and determine an additional amount of reducing agent (i.e. relative to a predetermined amount) to increase NOx reduction efficiency.

For example, in another embodiment the control module 20 may increase a temperature of exhaust gas in the exhaust treatment system 38 and then determine the offset of the SCR catalyst 42. For example only, the control module 20 may increase the temperature of the exhaust gas by decreasing an A/F ratio of the engine 12 (i.e. enrich the A/F mixture), thus enriching the exhaust gas produced by combustion. Alternatively, for example only, the control module 20 may increase the temperature of the exhaust gas by actuating an HC injector (not shown) in the exhaust treatment system 38, thus enriching the exhaust gas. Alternatively, for example only, the control module 20 may increase the temperature of the exhaust gas by controlling an amount of EGR.

A temperature sensor 52 may be implemented upstream from the SCR catalyst 42 to measure exhaust gas temperature. The exhaust treatment system 38 may further include NOx sensors 53, 54 located upstream and downstream from the SCR catalyst 42, respectively. While two NOx sensors 53, 54 are shown in FIG. 1, the exhaust treatment system 38 may include more or less than two NOx sensors. For example only, NOx sensors may be implemented upstream and/or downstream of each component in the exhaust treatment system 38. Each NOx sensor 53, 54 generates a NOx level signal that indicates an amount of NOx in the exhaust gas. The control module 20 may use the NOx level signals to determine a conversion efficiency of the SCR catalyst 42 and to determine the amount of reducing agent to inject into the exhaust gas. For example, the control module 20 may determine a correction factor based on the efficiency of the SCR catalyst 42, and may then multiply a predetermined amount of reducing agent by the correction factor to determine a new amount of reducing agent to inject.

The engine system 10 may also include an EGR system 56. The EGR system 56 may include an EGR valve 58 and an EGR line 60. The EGR system 56 may introduce a portion of exhaust gas from the exhaust manifold 34 into the intake manifold 14. The EGR valve 58 may be mounted on the intake manifold 14. The EGR line 60 may extend from the exhaust manifold 34 to the EGR valve 58, providing communication between the exhaust manifold 34 and the EGR valve 58. The control module 20 may actuate the EGR valve 58 to increase or decrease an amount of exhaust gas introduced into the intake manifold 14.

The engine 12 may also include a turbocharger 62. The turbocharger 62 may be driven by the exhaust gas received through a turbine inlet. For example only, the turbocharger 62 may include a variable nozzle turbine. The turbocharger 62 increases airflow into the intake manifold to cause an increase in intake manifold pressure (i.e., boost pressure). The control module 20 actuates the turbocharger 62 to selectively restrict the flow of the exhaust gas, thereby controlling the boost pressure.

Figure 2:
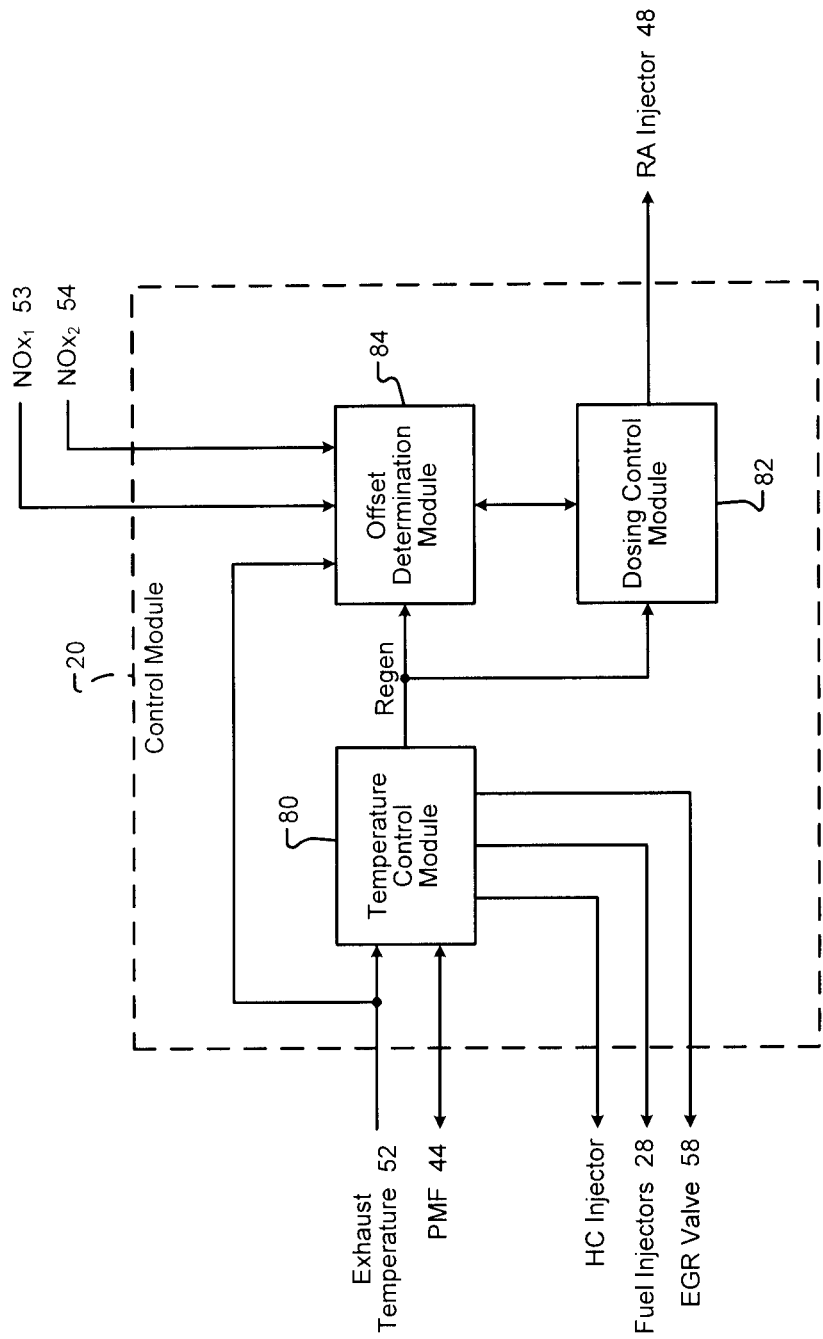
FIG. 2 is a functional block diagram of an exemplary control module according to the present disclosure.

Referring now to FIG. 2, the control module 20 is shown in more detail. The control module 20 may include a temperature control module 80, a dosing control module 82, and an offset determination module 84.

The temperature control module 80 receives a temperature signal from temperature sensor 52. The temperature control module 80 also communicates with the PMF 44 to determine whether a regeneration cycle is occurring or is imminent. For example, the PMF 44 may be filled with particulate matter for more than a predetermined threshold and thus a regeneration cycle may be imminent. Alternatively, the temperature control module 80 may initiate the regeneration cycle of the PMF 44. The temperature control module 80 may also generate a control signal for the fuel injectors 28 to enrich the A/F mixture.

During the regeneration cycle, the temperature control module 80 may generate a regeneration signal. In other words, the regeneration signal may notify the dosing control module 82 about the regeneration cycle. However, when a regeneration cycle is not initiated, occurring, or imminent (i.e. within a predetermined period of time), the temperature control module 80 may generate the control signal for the fuel injectors 28. Alternatively, the temperature control module 80 may generate a control signal for a hydrocarbon (HC) injector in the exhaust treatment system 38 (upstream from the SCR catalyst 42). Alternatively, the temperature control module 80 may generate a control signal for the EGR valve 58. In other words, the temperature control module 80 may increase the temperature of the exhaust gas in the exhaust treatment system 38.

The dosing control module 82 receives the regeneration signal from the temperature control module 80 and the temperature signal from temperature sensor 52. The dosing control module 82 may adjust an amount of reducing agent injected into the exhaust stream. For example, the dosing control module 82 may generate a control signal for the reducing agent injector 48. The dosing control module 82 also communicates with the offset determination module 84. The dosing control module 82 may adjust the amount of reducing agent injected into the exhaust stream based on a status of the regeneration signal. In other words, the dosing control module 82 may include different set points for the amount of reducing agent injected according to whether a regeneration cycle is occurring or the temperature of the exhaust gas is being increased by the temperature control module 80.

The offset determination module 84 measures NOx levels upstream from and downstream from the SCR catalyst 42. For example, the NOx levels may be measured using NOx sensor 53 and NOx sensor 54, respectively. The offset determination module 84 compares the measured NOx levels to expected NOx levels for the SCR catalyst 42. The expected NOx levels for the SCR catalyst 42 may be based on exhaust gas temperature and/or amount of reducing agent injection. For example, the expected NOx levels for the SCR catalyst 42 may be stored in a look-up table. Additionally, for example, the offset determination module 84 receives the regeneration signal and thus may include different expected NOx levels according to whether a regeneration cycle is occurring.

The offset determination module 84 determines a dosing offset for the SCR catalyst based on the measured NOx levels and the expected NOx levels. In other words, the control module 20 may determine an efficiency of the SCR catalyst 42, and determine an additional amount of reducing agent (i.e. relative to a predetermined amount) to increase NOx reduction efficiency. In one embodiment, the offset determination module 84 may determine a plurality of dosing offsets corresponding to various exhaust gas temperatures and/or amounts of reducing agent injected. For example, the dosing offset(s) may be in the form of a correction factor that is based on the efficiency of the SCR catalyst 42. Thus, the dosing control module 82 may multiply a predetermined amount of reducing agent (i.e. a base amount) by the correction factor to determine a new amount of reducing agent to inject to increase NOx reduction efficiency.

As previously stated, the dosing offset may correspond to an additional amount of reducing agent required by the SCR catalyst 42 for complete NOx reduction. In other words, for example, the SCR catalyst 42 may deteriorate over time and thus efficiency of the SCR catalyst 42 may decrease. The dosing control module 82 may then inject an amount of reducing agent into the exhaust stream based on a predetermined amount (i.e. normal operation) and the dosing offset. For example, the dosing control module 82 may inject the predetermined amount of reducing agent plus the dosing offset. Alternatively, the dosing control module 82 may inject a product of the predetermined amount of reducing agent and a correction factor.

In one embodiment, the offset determination module 84 may determine dosing offsets for a plurality of different exhaust gas temperature levels and/or amounts of reducing agent injected into the exhaust stream. For example, the plurality of dosing offsets may be stored in a look-up table. The dosing control module 82 may then adjust the amount of reducing agent injected into the exhaust stream based on the dosing offset. For example, the dosing control module 82 may increase the amount of reducing agent injected by the dosing offset from a predetermined amount. In one embodiment, the dosing control module 82 may adjust the amount of reducing agent after the regeneration cycle of the PMF 44 has completed. Alternatively, the dosing control module 82 may adjust the amount of reducing agent by the dosing offset after a predetermined period of time.

Figure 3:
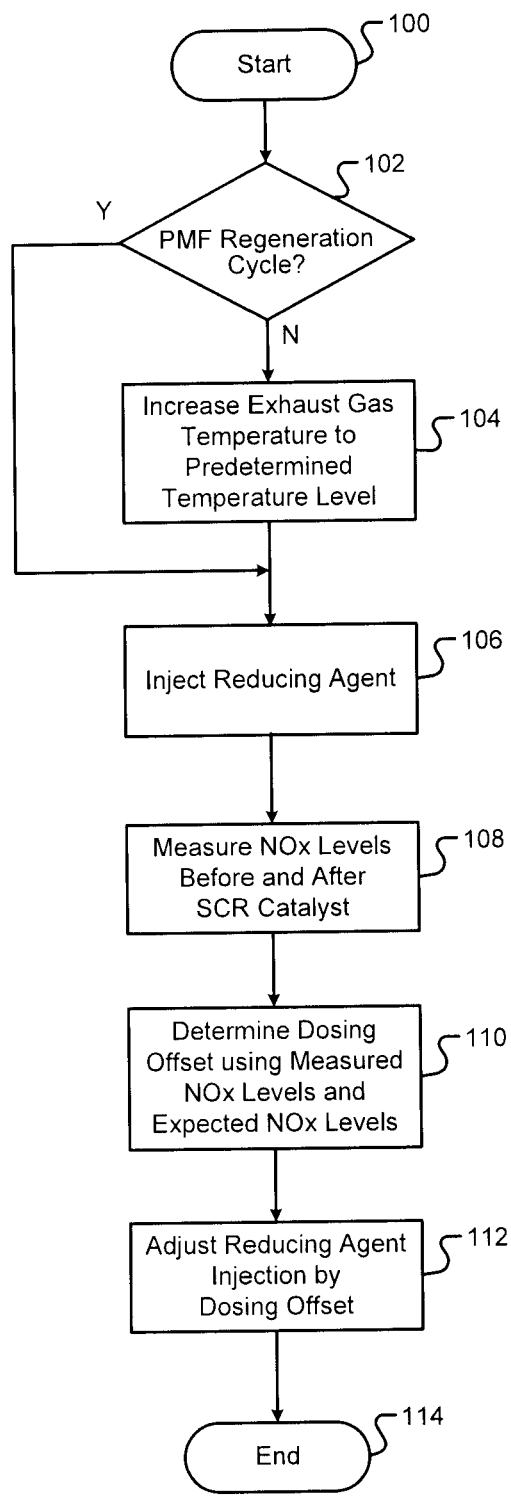
FIG. 3 is a flow diagram of an exemplary method for controlling an exhaust treatment system according to the present disclosure.

Referring now to FIG. 3, a method for controlling injection of reducing agent in the exhaust treatment system 38 begins in step 100. In step 102, the control module 20 determines whether a regeneration cycle of the PMF 44 is initiated, occurring, or imminent (i.e. within a predetermined period of time). If true, control may proceed to step 106. If false, control may proceed to step 104.

In step 104, the control module 20 increases the temperature of the exhaust gas to a predetermined temperature level. In step 106, the control module 20 injects reducing agent into the exhaust stream. In step 108, the control module 20 measures NOx levels upstream from and downstream from the SCR catalyst 42.

In step 110, the control module 20 determines a dosing offset corresponding to the temperature level and the amount of reducing agent injected into the exhaust stream. For example, the control module 20 may adjust the amount of reducing agent and measure the NOx levels a plurality of times to construct a look-up table of dosing offsets. In step 112, the control module 20 adjusts the amount of reducing agent injected into the exhaust stream by the dosing offset. Control may then end in step 114.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system, comprising:
   a first electronic circuit configured to
   (i) during a first period, actuate an injector to inject a first amount of reducing agent into exhaust gas produced by an engine, wherein the first period begins when a temperature of the exhaust gas increases above a temperature threshold, and wherein the exhaust gas temperature being greater than the temperature threshold results in regeneration of a particulate matter filter, and
   (ii) during a second period, actuate the injector to inject a second amount of the reducing agent into the exhaust gas, wherein the second period is subsequent to the first period and begins when the temperature of the exhaust gas falls below the temperature threshold; and
   a second electronic circuit configured to, during the first period, (i) determine an efficiency of a selective catalytic reduction (SCR) material based on measured amounts of nitrogen oxide (NOx) during the first period and expected NOx amounts, and (ii) determine a dosing offset based on the determined efficiency of the SCR material,
   wherein the second amount of the reducing agent is based on the dosing offset.

2. The engine control system of claim 1, wherein the second amount of the reducing agent is based on a sum of the first amount of the reducing agent and the dosing offset.

3. The engine control system of claim 1, wherein the second amount of the reducing agent is based on a product of the first amount of the reducing agent and the dosing offset.

4. The engine control system of claim 1, further comprising:
   a third electronic circuit configured to increase the exhaust gas temperature to a temperature greater than the temperature threshold.

5. The engine control system of claim 4, wherein the third electronic circuit is configured to increase the exhaust gas temperature by one of decreasing an air/fuel (A/F) ratio of the engine, actuating an injector to inject fuel into the exhaust gas, and actuating an exhaust gas recirculation (EGR) valve to decrease an amount of EGR.

6. The engine control system of claim 1, wherein the first electronic circuit is configured to perform N adjustments of the first amount of the reducing agent during the first period, wherein the first electronic circuit performs each of the N adjustments based on the measured NOx amounts, and wherein N is an integer greater than one.

7. The engine control system of claim 6, wherein the second electronic circuit is configured to perform N determinations of the efficiency of the SCR material for the N adjusted amounts of reducing agent injected, respectively, and store the N determined efficiencies in a look-up table.

8. A method, comprising:
   during a first period, injecting a first amount of reducing agent into exhaust gas produced by an engine, wherein the first period begins when a temperature of the exhaust gas increases above a temperature threshold, and wherein the exhaust gas temperature being greater than the temperature threshold results in regeneration of a particulate matter filter;
   during the first period, determining an efficiency of a selective catalytic reduction (SCR) material based on measured amounts of nitrogen oxide (NOx) during the first period and expected NOx amounts;
   during the first period, determining a dosing offset based on the determined efficiency of the SCR material; and
   during a second period, injecting a second amount of the reducing agent into the exhaust gas,
   wherein the second period is subsequent to the first period and begins when the temperature of the exhaust gas falls below than the temperature threshold, and
   wherein the second amount of the reducing agent is based on the dosing offset.

9. The method of claim 8, wherein the second amount of the reducing agent is based on a sum of the first amount of the reducing agent and the dosing offset.

10. The method of claim 8, wherein the second amount of the reducing agent is based on a product of the first amount of the reducing agent and the dosing offset.

11. The method of claim 8, further comprising:
    increasing the exhaust gas temperature to a temperature greater than the temperature threshold.

12. The method of claim 11, further comprising:
increasing the exhaust gas temperature by one of decreasing an air/fuel (A/F) ratio of the engine, actuating an injector to inject fuel into the exhaust gas, and actuating an exhaust gas recirculation (EGR) valve to decrease an amount of EGR.

13. The method of claim 8, further comprising:
performing N adjustments of the first amount of the reducing agent during the first period, wherein each of the N adjustments is based on the measured NOx amounts, and wherein N is an integer greater than one.

14. The method of claim 13, further comprising:
performing N determinations of the efficiency of the SCR material for the N adjusted amounts of reducing agent injected, respectively; and
storing the N determined efficiencies in a look-up table.

15. The engine control system of claim 1 further comprising at least one of an Application Specific Integrated Circuit (ASIC), a processor (shared, dedicated, or group) and memory that execute one or more software or firmware programs, and/or a combinational logic circuit that includes the first electronic circuit and the second electronic circuit.

16. The engine control system of claim 1, wherein the second electronic circuit is configured to, during the first period, determine the dosing offset by adjusting the first amount of the reducing agent until the determined efficiency of the SCR material reaches a predetermined efficiency.

17. The engine control system of claim 1, wherein the measured amounts of NOx are measured at locations upstream and downstream from the SCR material, and wherein the expected NOx amounts are based on the exhaust gas temperature and the first amount of the reducing agent.

18. The method of claim 8, further comprising, during the first period, determining the dosing offset by adjusting the first amount of the reducing agent until the determined efficiency of the SCR material reaches a predetermined efficiency.

19. The method of claim 8, wherein the measured amounts of NOx are measured at locations upstream and downstream from the SCR material, and wherein the expected NOx amounts are based on the exhaust gas temperature and the first amount of the reducing agent.

* * * * *